United States Patent Office 2,885,870
Patented May 12, 1959

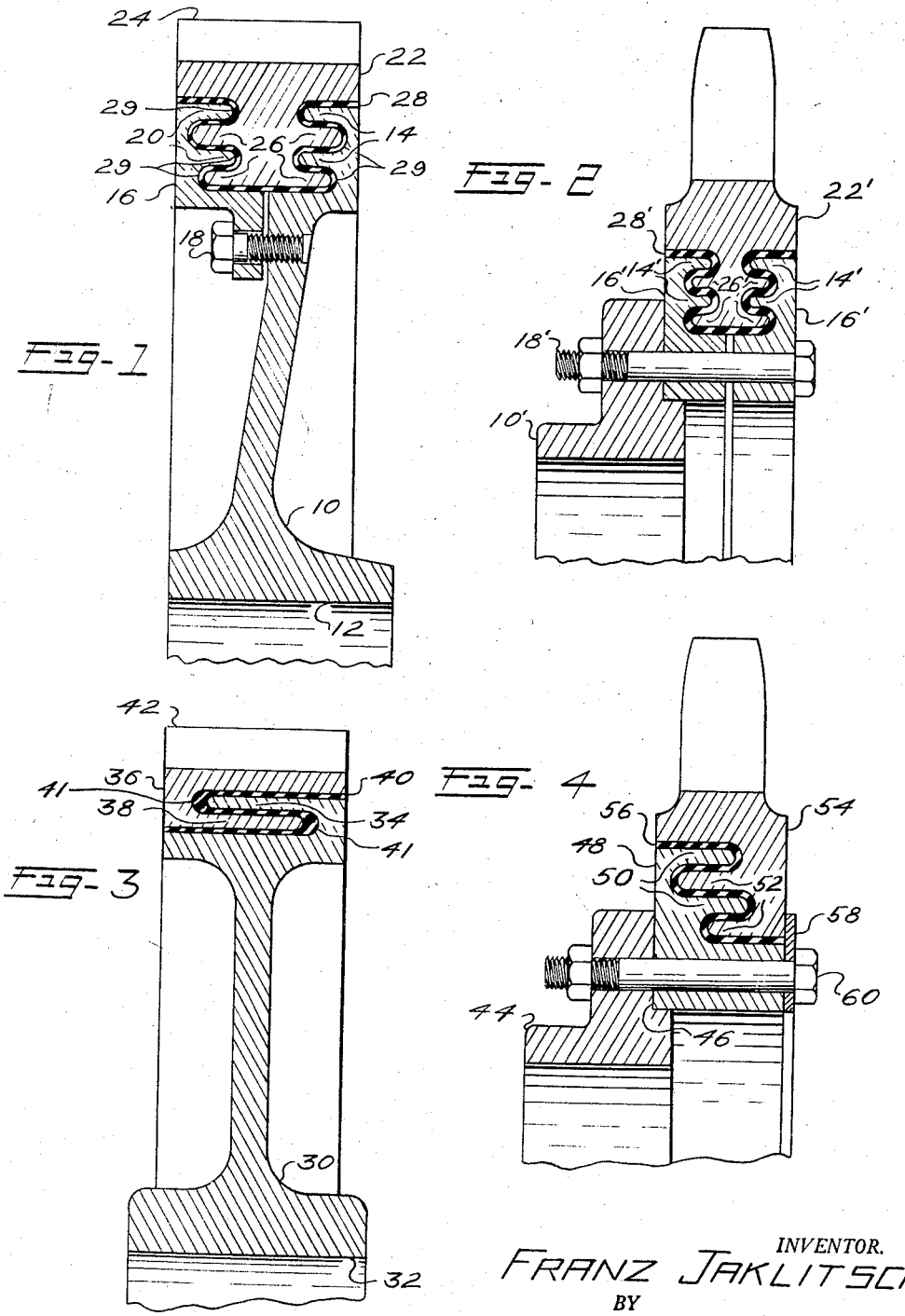

2,885,870

TORQUE TRANSMITTING DEVICE

Franz Jaklitsch, Royal Oak, Mich.

Application April 18, 1957, Serial No. 653,714

11 Claims. (Cl. 64—11)

(Granted under Title 35, U.S. Code (1952), sec. 266)

The invention described herein may be manufactured and used by or for the Government for governmental purposes without the payment of any royalty thereon.

The invention relates to torque transmitting devices, and particularly to transmitting devices utilizing impact and shock absorption means.

Studies of the characteristics of gear wheels, chain sprockets and other torque transmitting devices have discovered that the rate of wear of gears and sprockets of a power train is usually excessive where the torque transmitting elements are subject to sudden impacts or to high instantaneous torques. Investigation of the different factors influencing wear have shown that, when the teeth of a gear or sprocket are subjected to the excessive pressures imposed by sudden application of torque, the amount of wear increases by the eighth and tenth power of the pressure. It is these high Hertzian pressures which cause gears and sprockets to wear out rapidly, resulting in expensive and troublesome maintenance problems in power trains transmitting high and rapidly changing torques, such as encountered in heavy vehicle transmissions.

It is thus an object of the invention to produce a torque transmitting device which is capable of minimizing peak stress values and critical pressures by utilization of an elastic link which has the ability to store the inertia energy creating shocks and sudden impacts due to rapid changes in torque transmission.

A further object of the invention is to produce a torque transmitting device which will reduce wear of the driving surfaces and also reduce noise created by the engagement of gears or sprockets.

Yet another object of the invention is to produce a torque transmitting device utilizing a resilient bonded linkage, yet providing excellent lateral stability while permitting shearing deflection to absorb impact forces.

Another object of the invention is to produce a gear or sprocket using a resilient bonded linkage between the hub and teeth which is capable of transmitting heavy torques, produces a large bonding area for the linkage, yet maintains the critical dimensions of the gear or sprocket.

These and other objects of the invention will become apparent when reviewed with regard to the accompanying specification and drawings wherein:

Figs. 1 and 3 are cross-section elevational views of half of a gear utilizing the construction of the invention.

Figs. 2 and 4 are cross-section elevational views of half of a sprocket using various modifications of the invention.

Although the concepts of the invention may be employed with various types of torque transmitting elements such as gears, chains, sprockets, pulleys, sheaves and drums, the illustrations and detailed descriptions are directed to use with gears and sprockets only.

As seen in Fig. 1, the invention may take the form of an annular gear hub 10 provided with a bore 12 whereby the hub 10 may be journaled or keyed to a shaft. The hub 10 is provided with a series of annular concentric flanges 14 forming surfaces which extend substantially parallel to the axis of hub 10 for a purpose later described.

An annular casing 16 is adapted to be affixed to the hub 10 by a series of bolts 18 which thread into holes formed in the hub. Casing 16 is also provided with concentric flanges 20 projecting toward flanges 14 in opposing relation thereto. The annular gear rim 22 is formed as a separate unit and is provided with gear teeth 24 and concentric rim projections 26 which interlock between the flanges 14 and 20. An elastic layer of resilient material 28, preferably rubber, is interposed between the hub 10, casing 16 and rim 22.

The gear of Fig. 1 is assembled in the following manner:

The layer 28 is usually molded in a cross-sectional form similar to that shown, and is placed over the projections 26 completely covering the entire inner periphery of rim 22 with a sheet of rubber. After the layer is assembled on rim 22, the rim is placed on hub 10, such that projections 26 interlock with flanges 14; the casing 16 is then affixed to hub 10 by the bolts 18 locking the rim 22 in position. As a result of tightening the bolts 18, considerable pressure is exerted on the layer 28 thereby compressing the layer and providing the necessary clamping action to insure a strong bonding of the elastic layer to the hub 10, casing 16 and rim 22 of the gear. The assembled gear may now be subjected to any suitable conventional process which will bond the layer 28 to rim 22, casing 16 and hub 10.

The unique gear construction of the invention provides advantages not present in elastic supported gears presently available. For instance, the shape of the flanges 14 and 20 and projections 26 enable a large area of elastic material to be used in a narrow gear which provides a large surface for bonding the elastic to the components of the gear enabling the gear to transmit very high torque forces without failure of the bond or the elastic material. By extending the flanges 14 and 20 and projections 26 in a direction parallel to the axis of hub 10, forces imposed on the gear teeth 24 perpendicular to the axis of hub 10 are counteracted by the resistance to compression of layer 28, and, as a substantial area of the layer 28 lies in the plane perpendicular to these forces, very efficient use is made of the characteristics of the layer 28. It is well known that the shearing deflection of rubber is six to eight times greater than deformation caused by compression or tension, and the fact that much of layer 28 is at right angles to compression forces exerted on teeth 24 will put much of layer 28 under direct compression, rather than including shearing components, thus preventing changes in the radius of the pitch circle which would affect the meshing of the gear teeth and wear and efficiency thereof.

The only portions of layer 28 which will be under shear due to compressive forces imposed on teeth 24 and rim 22 are the arcuate layer portions as at 29, as designated in Fig. 1, however, as the portions 29 will be under compression due to the pressure exerted by casing 16 and bolts 18 the shearing deformation of the material of layer 28 in the region of portions 29 will be greatly reduced from that of resilient material not precompressed, additionally, lateral pressures of convenient magnitudes on bonded shear parts are of benefit in increasing the static fatigue life of the bond. Thus, the layer 28 will effectively resist deformation from compression forces acting on rim 22 at right angles to the axis of hub 10.

The forces, which the layer 28 is primarily concerned with absorbing, are sudden impact and torque forces transmitted through the gear teeth or hub. As these forces will be tangential to the layer 28, the layer 28 will absorb impact and torque by shearing deformation and prevent sudden shocks from being transmitted beyond the elastic layer. As mentioned above, rubber is capable of much greater deformation under shear forces than under compression or tension forces and, as the layer 28 may be of substantial area due to the flanges and projections, large torque and impact shocks may be absorbed without failure of the layer bonding or material.

The construction of the invention also permits easy assembly, as the hub 10 and casing 16 radially enclose a substantial part of rim 22, the rim is prevented from lateral movement which is especially important with gearing of the spiral type.

A modification of a sprocket utilizing concepts of the invention is shown in Fig. 2 wherein the hub 10' does not directly contact the elastic layer. Castings 16' are attached to the hub by bolts 18' and are provided with flanges 14' which interlock with the projections 26' of rim 22'. The elastic layer 28' is interposed between the rim 22' and casings 16' and functions as described above. This construction of Fig. 2 is especially adapted to sprockets.

Another form of the invention is shown in Fig. 3 wherein a hub 30 is formed with a bore 32 and flange 34. The rim 36 is also formed with an interlocking projection 38 which will provide a large bonding area for the elastic layer 40. The embodiment of Fig. 3 is best assembled in a press, not shown, where the rim 36 and hub 30 may be held together under pressure until the bonding of the layer 40 to the rim and hub is complete and cured. The resultant gear is especially adapted for use with helical gears wherein the angle of teeth 42 and direction of gear rotation is such that the rim 36 will be biased to the right, as shown in Fig. 3, maintaining the resilient layer 40 in compression. An additional thickness or reinforcing layer of resilient material 40 is provided at the arcuate portions 41, where the axial force vectors created by the helical teeth will subject the resilient layer 40 to constant localized compression stresses, preventing destruction of the layer 40 at these critical points, by avoiding stress concentration by appropriate thickness of the bonded layer. An additional thickness of resilient layer at high stress regions may be used with all of the illustrated embodiments of the invention subjected to lateral pressure, either intentionally as in Figs. 1 and 2, or by working principle as would be the case when helical teeth are used on the gears of Figs. 1 and 3. In varying the thickness of the bonded layer of the bonds subjected to compression in addition to shear, stress concentration will be avoided and the static fatigue life increased.

The embodiment of Fig. 4 is another simplified form of the invention as used with a sprocket where torque requirements are not as great as those transmitted by the gear of Fig. 1 or sprocket of Fig. 2. The hub 44 is recessed at 46 to support the annular casing 48. The flanges 50 of the casing cooperate with the projections 52 of rim 54 to provide bonding and support surfaces for the elastic layer 56. A ring 58 abuts against rim 54 augmenting the bond of the layer 56, and the entire assembly is held together by a series of spaced bolts 60.

By using interlocking flanges and projections extending parallel to the gear axis a large efficient elastic layer may be employed in a narrow gear increasing the bonding area and torque transmitting capacity. As the elastic layer is fully enclosed, there are no voids or chambers into which the rubber could expand or extrude during compression thereby preventing sufficient changes in the radius of the pitch circle to affect the efficiency of the gear or sprocket, etc. while lateral support of the rim prevents misalignment due to force vectors imposed on the rim parallel to the hub axis. As the high instantaneous pressures imposed on the torque transmitting devices by rapid torque fluctuations and impacts are cushioned and absorbed by the elastic layer, the life of the device is substantially lengthened. The elastic layer also tends to decrease noise and vibrations produced by gears and sprockets resulting in quiet and smooth operating power trains. If a lightweight gear or sprocket is desired, the hub may be made of lightweight material such as aluminum or magnesium and the rim of hardened steel thereby resulting in a light, long wearing device.

Although various embodiments of the invention are illustrated and described, other modifications may be apparent to those skilled in the art without departing from the spirit and scope of the invention, and it is intended the invention be limited only by the following claims.

I claim:

1. A torque transmitting device comprising an annular hub, a plurality of annular surfaces supported by said hub, said surfaces being radially spaced and extending substantially parallel to the axis of said hub, an annular torque transmitting rim supportedly mounted for rotation with said hub and radially spaced from said axis thereof, a plurality of radially spaced annular surfaces formed on said rim adapted to interlock between the hub supported surfaces and a layer of elastic material circumferentially interposed between said rim and hub surfaces and bonded thereto.

2. A torque transmitting device comprising an annular hub, a plurality of concentric annular flanges supported by said hub, said flanges being radially spaced and extending substantially parallel to the axis of said hub, an annular torque transmitting rim supportedly mounted for rotation with said hub and radially spaced from said axis thereof, a plurality of radially spaced annular projections formed on said rim adapted to interlock between the hub supported flanges and a layer of resilient material interposed between said flanges and said projections and bonded thereto.

3. A torque transmitting device comprising an annular hub, a plurality of concentric annular flanges carried by said hub, said flanges being radially spaced and extending substantially parallel to the axis of the hub, an annular casing formed with axial extending radially spaced flanges adapted to be affixed to said hub whereby the flanges of said hub and said casing are in opposing relation, a torque transmitting rim circumferentially mounted on said hub, radially spaced projections formed on said rim interlocking with the flanges of said hub and rim and a layer of elastic material interposed between said flanges and said projections and bonded thereto.

4. A torque transmitting device as in claim 3 wherein the elastic layer is composed of rubber and the casing is affixed to the hub by means of bolts.

5. In a torque transmitting device comprising an annular hub, a pair of casings affixed to said hub concentric thereto, a plurality of annular flanges formed on each of said casings radially spaced and extending substantially parallel to the axis of said hub, said flanges of the separate casings in spaced opposed relationship, a torque transmitting rim circumferentially mounted on said casings and provided with radially spaced annular projections adapted to interlock with the flanges of the casings and a layer of elastic material interposed between said flanges and said projections and bonded thereto.

6. A torque transmitting device comprising a hub, an annular flange forming the periphery of said hub, said flange extending substantially parallel to the axis of said hub, a torque transmitting rim circumferentially mounted on said hub, an annular projection formed on said rim underlying said flange and a layer of elastic material interposed between said hub and said rim and bonded thereto.

7. In a torque transmitting device comprising a hub, a casing secured to said hub concentric thereto, a plurality of annular flanges formed on said casing in radially spaced relationship and extending substantially parallel to the axis of said hub, a torque transmitting rim circumferentially mounted on said casing and formed with a plurality of radially spaced annular projections, said projections interlocked between said flanges, a layer of elastic material interposed between said flanges and said projections and bonded thereto, and a ring supported by said casing in engagement with said rim augmenting connection between said casing and rim.

8. A torque transmitting device as defined in claim 6 in which said layer is reinforced with additional material adjacent the tips of said flanges and said projections.

9. A torque transmitting device comprising a hub, an annular flange supported by said hub, said flange extending substantially parallel to the axis of said hub, a torque transmitting rim circumferentially mounted on said hub, an annular projection formed on said rim underlying said flange and a layer of elastic material interposed between said hub supported flange and said rim and bonded thereto.

10. A torque transmitting device as defined in claim 9 wherein said layer is composed of rubber.

11. A torque transmitting device comprising a hub, a casing secured to said hub concentric thereto, a plurality of annular flanges formed on said casing in radially spaced relationship and extending substantially parallel to the axis of said hub, a torque transmitting rim circumferentially mounted on said casing and formed with a plurality of radially spaced annular projections, said projections interlocked between said flanges, a layer of elastic material interposed between said flanges and said projections and bonded thereto.

References Cited in the file of this patent

UNITED STATES PATENTS

| | | |
|---|---|---|
| 2,126,705 | Schmidt | Aug. 16, 1938 |

FOREIGN PATENTS

| | | |
|---|---|---|
| 567,536 | Great Britain | Feb. 19, 1945 |